United States Patent
Okabe et al.

(10) Patent No.: US 11,928,198 B2
(45) Date of Patent: Mar. 12, 2024

(54) AUTHENTICATION DEVICE AND AUTHENTICATION METHOD

(71) Applicant: NEC Corporation, Tokyo (JP)

(72) Inventors: Koji Okabe, Tokyo (JP); Hitoshi Yamamoto, Tokyo (JP); Takafumi Koshinaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 342 days.

(21) Appl. No.: 17/355,480

(22) Filed: Jun. 23, 2021

(65) Prior Publication Data

US 2021/0319087 A1 Oct. 14, 2021

Related U.S. Application Data (63) Continuation of application No. 16/475,730, filed as application No. PCT/JP2017/011716 on Mar. 23, 2017, now Pat. No. 11,074,329.

(51) Int. Cl.
  *G06F 21/32* (2013.01)
  *G06F 21/45* (2013.01)

(52) U.S. Cl.
  CPC .............. *G06F 21/32* (2013.01); *G06F 21/45* (2013.01)

(58) Field of Classification Search
  CPC .................................. G06F 21/32; G06F 21/45
  See application file for complete search history.

(56) References Cited

U.S. PATENT DOCUMENTS

| 10,019,561 | B1 | 7/2018 | Shelton | G06F 21/32 |
| 2009/0087038 | A1* | 4/2009 | Okada | G06V 40/175 382/118 |
| 2011/0135168 | A1* | 6/2011 | Hosoi | G06V 40/172 382/118 |
| 2012/0308090 | A1* | 12/2012 | Sukegawa | G06V 40/172 382/118 |

(Continued)

FOREIGN PATENT DOCUMENTS

| JP | 4544363 A | 9/2010 |
| JP | 2012-252654 A | 12/2012 |

(Continued)

OTHER PUBLICATIONS

Japanese Office Action for JP Application No. 2021-034945 dated Jan. 18, 2022 with English Translation.

(Continued)

*Primary Examiner* — Abiy Getachew (57) ABSTRACT

An authentication device is provided with: a plurality of attribute-dependent score calculation units each calculating an attribute-dependent score dependent on a prescribed attribute for input data; an attribute-independent score calculation unit for calculating an attribute-independent score independent of the attribute for the input data; an attribute estimation unit for performing attribute estimation for the input data; and a score integration unit for determining a score weight of each of a plurality of attribute-dependent scores and of the attribute-independent score using the result of the attribute estimation and calculating an output score using the attribute-dependent scores, the attribute-independent score, and the determined score weights.

11 Claims, 5 Drawing Sheets

(56) References Cited

U.S. PATENT DOCUMENTS

| | | | |
|---|---|---|---|
| 2013/0254143 A1* | 9/2013 | Ueki | G06Q 30/02 |
| | | | 706/15 |
| 2014/0230032 A1 | 8/2014 | Duncan | G06F 21/32 |
| | | | 726/7 |
| 2016/0366128 A1 | 12/2016 | Dascola | H04L 63/0892 |
| 2016/0378964 A1 | 12/2016 | Singh | G06F 21/32 |
| | | | 340/5.52 |
| 2017/0286746 A1 | 10/2017 | Tieu | G06K 9/685 |
| 2019/0132312 A1 | 5/2019 | Dotto | H04L 63/0861 |
| 2020/0014540 A1 | 1/2020 | Kaga | H04L 9/0866 |

FOREIGN PATENT DOCUMENTS

| | | | |
|---|---|---|---|
| JP | 2014-115948 A | 6/2014 | |
| JP | 2015-125731 A | 7/2015 | |
| WO | 2012/077476 A1 | 6/2012 | |

OTHER PUBLICATIONS

International Search Report dated Jun. 6, 2017, issued by the International Searching Authority in application No. PCT/JP2017/011716.
Written Opinion dated Jun. 6, 2017, issued by the International Searching Authority in application No. PCT/JP2017/011716.
Morammed Senoussaoui et al., "Mixture of PLDA Models in I-Vector Space for Gender-Independent Speaker Recognition", Interspeech 2011, Aug. 28-31, 2011, pp. 25-28 (4 pages).

* cited by examiner

AUTHENTICATION DEVICE AND AUTHENTICATION METHOD

The present application is a Continuation application of Ser. No. 16/475,730 filed on Jul. 3, 2019, which is a National Stage Entry of PCT/JP2017/011716 filed on Mar. 23, 2017, the contents of all of which are incorporated herein by reference, in their entirety.

TECHNICAL FIELD

This invention relates to an authentication device and an authentication method.

BACKGROUND ART

In general, for personal verification at the time of a bank transaction or the like, authentication using a password or a personal identification number is used. However, some people may forget even their own passwords or personal identification numbers, and thus there is a problem in that a new password or personal identification number is required to be reissued in such a case. There is another problem in that, when a password or a personal identification number is leaked, another person can easily impersonate a person whose password or a personal identification number has been leaked. Thus, in recent years, there has been adopted a biometric authentication technology for performing personal verification by receiving input of biometric information. In the biometric authentication, biometric information such as a fingerprint, a face, a voice, and an iris is used.

In the biometric authentication technology using the biometric information, such an optimal model parameter as to enable the best authentication accuracy to be achieved generally differs depending on an attribute of input data. The attribute of input data is, for example, a characteristic associated with the input data, such as a device having biometric information recorded therein, a gender, or an age. Accordingly, when an attribute of input data is known, and when an attribute-dependent authentication device tuned for the attribute exists, the use of the attribute-dependent authentication device has an advantage in that authentication accuracy becomes generally higher than in the case of using an attribute-independent authentication device that supports various attributes.

Meanwhile, input of an attribute at the time of authentication is a great burden on a user, and hence it is desired to avoid the input of an attribute.

In Non Patent Document 1, there is proposed a method relating to a speaker verification technology, and the method involves estimating an attribute of an input voice, which is a gender, weighting verification scores output from respective gender-dependent speaker verification devices for male and female based on manliness and womanliness corresponding to an estimation result, and adding the resultant verification scores to each other for use.

Figure 1:
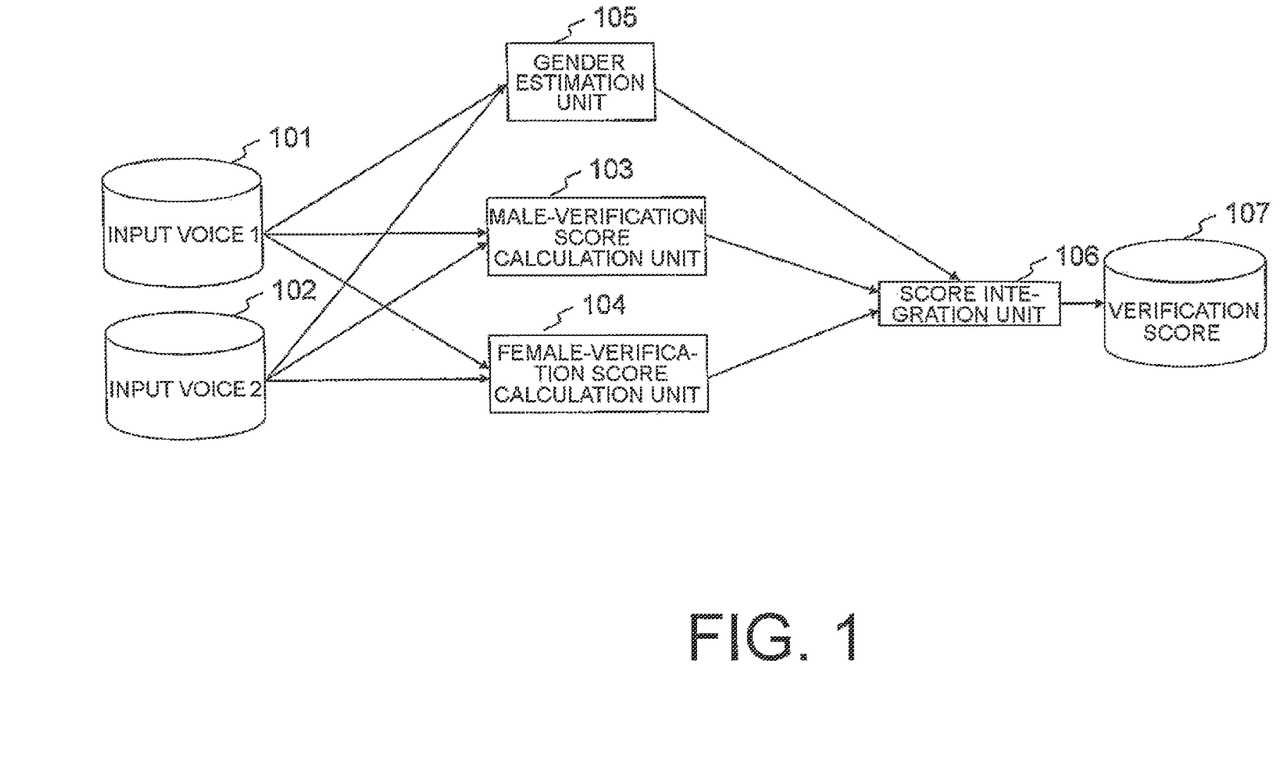
FIG. 1 is a block diagram for illustrating a configuration of a verification device derived from Non Patent Document 1.

FIG. 1 is a diagram for illustrating a block configuration of a verification device derived from Non Patent Document 1. As illustrated in FIG. 1, a male-verification score calculation unit 103 and a female-verification score calculation unit 104 each calculate an attribute-dependent score for each of two input voices 101 and 102.

A gender estimation unit 105 performs gender estimation on each of the two input voices 101 and 102 to obtain a gender likelihood ratio for each of the voices.

A score integration unit 106 uses the gender likelihood ratio and Expression (1) to determine weights to be given to the respective attribute-dependent scores, and uses the weights to integrate the attribute-dependent scores to output a resultant score as a verification score 107.

$$R = \frac{G_e G_t}{G_e G_t + 1} R_M + \frac{1}{G_e G_t + 1} R_F \text{ where } G_i = \frac{P(z_i \mid M)}{P(z_i \mid F)} \quad (1)$$

In this expression, R represents a verification score obtained after the integration of scores, $z_i$ represents each input voice, and $G_i$ represents a gender likelihood ratio of each input voice. Further, $R_M$ represents a male verification score, and $R_F$ represents a female verification score. Subscripts "e" and "t" represent values at a time of registration and at a time of verification, respectively, and any one of "e" and "t" is assigned to "i".

As a result of the gender estimation, a larger weight is added to the male verification score when the input voice is likely to be a male voice, while a larger weight is added to the female verification score when the input voice is likely to be a female voice.

Through use of this method, it is not required to input an attribute in advance, and it is possible to obtain higher verification accuracy than in the case of using a gender-independent speaker verification device.

PRIOR ART DOCUMENT

Non Patent Document

Non Patent Document 1: M. Senoussaoui, P. Kenny, N. Brummer, E. Villiers, and P. Dumouchel "Mixture of PLDA Models in I-Vector Space for Gender-Independent Speaker Recognition", in Proc. Interspeech 2011

SUMMARY OF THE INVENTION

Problem to be Solved by the Invention

However, in the above-mentioned method, there is a problem in that verification accuracy is lowered when the attribute estimation fails, that is, this method is not robust against a failure of attribute estimation. This is because, when the attribute estimation fails, a larger weight is given to a verification score of an authentication device corresponding to an attribute different from a true attribute to calculate a verification score. Moreover, such input as to cause a failure of attribute estimation may have an intermediate characteristic between the attributes in some cases, and a more accurate verification result is often obtained in a case where the attribute-independent score is used than in a case where a given attribute-dependent score is used.

This invention has been made in view of the above-mentioned circumstances, and has an object to provide an authentication device and an authentication method, which are capable of achieving high authentication accuracy.

A more specific object of this invention is to provide an authentication device and an authentication method, which are robust against a failure of attribute estimation and are capable of achieving high authentication accuracy.

Means to Solve the Problem

According to a first aspect of this invention, there is provided an authentication device characterized by comprising a plurality of attribute-dependent score calculation units each being configured to calculate an attribute-dependent score for input data depending on a given attribute, an attribute-independent score calculation unit configured to calculate an attribute-independent score, which is independent of the given attribute, for the input data, an attribute estimation unit configured to perform attribute estimation on the input data, and a score integration unit configured to determine a score weight of each of a plurality of attribute-dependent scores and a score weight of the attribute-independent score through use of a result of the attribute estimation, and calculate an output score through use of the attribute-dependent scores, the attribute-independent score, and the determined score weights.

Further, according to the first aspect of this invention, there is provided an authentication method characterized by comprising calculating a plurality types of attribute-dependent scores for input data depending on a given attribute, calculating an attribute-independent score, which is independent of the given attribute, for the input data;

performing attribute estimation on the input data, and determining a score weight of each of the plurality types of attribute-dependent scores and a score weight of the attribute-independent score through use of a result of the attribute estimation, and calculating an output score through use of the attribute-dependent scores, the attribute-independent score, and the determined score weights.

Still further, according to the first aspect of this invention, there is provided a program for causing a computer to execute calculating a plurality types of attribute-dependent scores for input data depending on a given attribute, calculating an attribute-independent score, which is independent of the given attribute, for the input data, performing attribute estimation on the input data, and determining a score weight of each of the plurality types of attribute-dependent scores and a score weight of the attribute-independent score through use of a result of the attribute estimation, and calculating an output score through use of the attribute-dependent scores, the attribute-independent score, and the determined score weights.

In addition, as a second aspect of this invention, there is provided an authentication device characterized by further comprising an attribute estimation reliability calculation unit configured to calculate and output a reliability of the result of the attribute estimation in addition to the authentication device according to the first aspect, and the score integration unit being configured to increase the score weight of the attribute-independent score for input having a low reliability.

Effect of the Invention

According to the first aspect, it is possible to provide the authentication device and the authentication method, which are capable of achieving high authentication accuracy.

According to the second aspect, it is possible to provide the authentication device and the authentication method, which are robust against a failure of attribute estimation and are capable of achieving high authentication accuracy.

MODES FOR EMBODYING THE INVENTION

Now, embodiments of this invention are described. The embodiments described below are only examples, and this invention is not limited to configurations in the embodiments described below.

A personal authentication device according to a first embodiment of this invention includes: a plurality of attribute-dependent score calculation units configured to calculate, for input data, attribute-dependent scores, which are specialized for a plurality of attributes on a one-to-one basis, and enable high authentication accuracy to be achieved; an attribute-independent score calculation unit configured to calculate, for the input data, an attribute-independent score, which enables high authentication accuracy to be achieved for all of the plurality of attributes; an attribute estimation unit configured to perform attribute estimation on the input data; an attribute estimation reliability calculation unit configured to calculate a reliability of a result of the attribute estimation to output the reliability as an attribute estimation reliability; and a score integration unit configured to determine an integration weight of each of a plurality of attribute-dependent scores and the attribute-independent score based on the result of the attribute estimation and the reliability, and use the determined integration weights to integrate output scores to output an integrated score.

A personal authentication method according to the first embodiment of this invention includes: calculating, for input data, attribute-dependent scores, which are specialized for a plurality of attributes on a one-to-one basis, and enable high authentication accuracy to be achieved; calculating, for the input data, an attribute-independent score, which enables high authentication accuracy to be achieved for all of the plurality of attributes; performing attribute estimation on the input data; calculating a reliability of a result of the attribute estimation to output the reliability as an attribute estimation reliability; and determining an integration weight of each of a plurality of attribute-dependent scores and the attribute-independent score based on the result of the attribute estimation and the reliability, and using the determined integration weights to integrate output scores to output an integrated score.

In this case, in the first embodiment and a second embodiment of this invention described later, an attribute-dependent model and an attribute-independent model are adopted in processing for personal authentication. The attribute-dependent model is a model tuned for each attribute, and when data having an attribute that is supported by the model is input to the model, the model can achieve high authentication accuracy in general. However, when data having an attribute that is not supported by the model is input to the model, the authentication accuracy is greatly lowered in general. Meanwhile, the attribute-independent model is a model tuned so as to be robust against all pieces of data having a plurality of attributes, and irrespective of an attribute corresponding to a piece of data that is input to the model, the authentication accuracy is not greatly lowered. On the other hand, in general, the attribute-independent model has lower authentication accuracy than that of the attribute-dependent model.

The model as used herein is not limited to a statistical model, and includes a changeover switch for switching a parameter or algorithm for controlling operation.

In the first and second embodiments, a weight of a score output from each of the models is determined based on an attribute estimation reliability. Specifically, when the attribute estimation reliability is high, the weight of the attribute-dependent score output from a corresponding attribute-dependent model is increased. Meanwhile, when the attribute estimation reliability is low, the weight of the attribute-independent score output from the attribute-independent model, which is highly robust, is increased. Then, the scores are integrated.

In this manner, according to the first and second embodiments, for input data for which the attribute estimation is likely to fail, a score obtained by assigning a larger weight to the attribute-independent model is output. Therefore, the first and second embodiments are robust against a failure of attribute estimation, and can thus achieve high authentication accuracy.

In the following, the above-mentioned embodiments are described in further detail. The first embodiment is given below as a specific embodiment of this invention. The first embodiment described below is an example of a case in which the above-mentioned attribute-independent authentication device and attribute-independent authentication method are applied to speaker verification. Accordingly, an input voice is assumed as input data. Further, a gender is used as an example of an attribute. As attribute-dependent models, two types of models, namely, a male model and a female model, are used.

Application of the above-mentioned attribute-independent authentication device and attribute-independent authentication method is not limited to application to speaker verification, and may be applicable to various modes of biometric authentication technology. For example, the above-mentioned attribute-independent authentication device and attribute-independent authentication method may also be applied to fingerprint authentication, face authentication, iris authentication, or other such authentication to suit the type of input data. Further, the attribute is not limited only to a gender. The above-mentioned attribute-independent authentication device and attribute-independent authentication method may also be applied to a language, a birthplace, an age, a device with input data recorded therein, and so on. Still further, a value that can be taken by an attribute is not limited to two values. For example, when an attribute is language, the attribute may take three or more values, such as Japanese, English, and Chinese.

First Embodiment (System Configuration)

Figure 2:
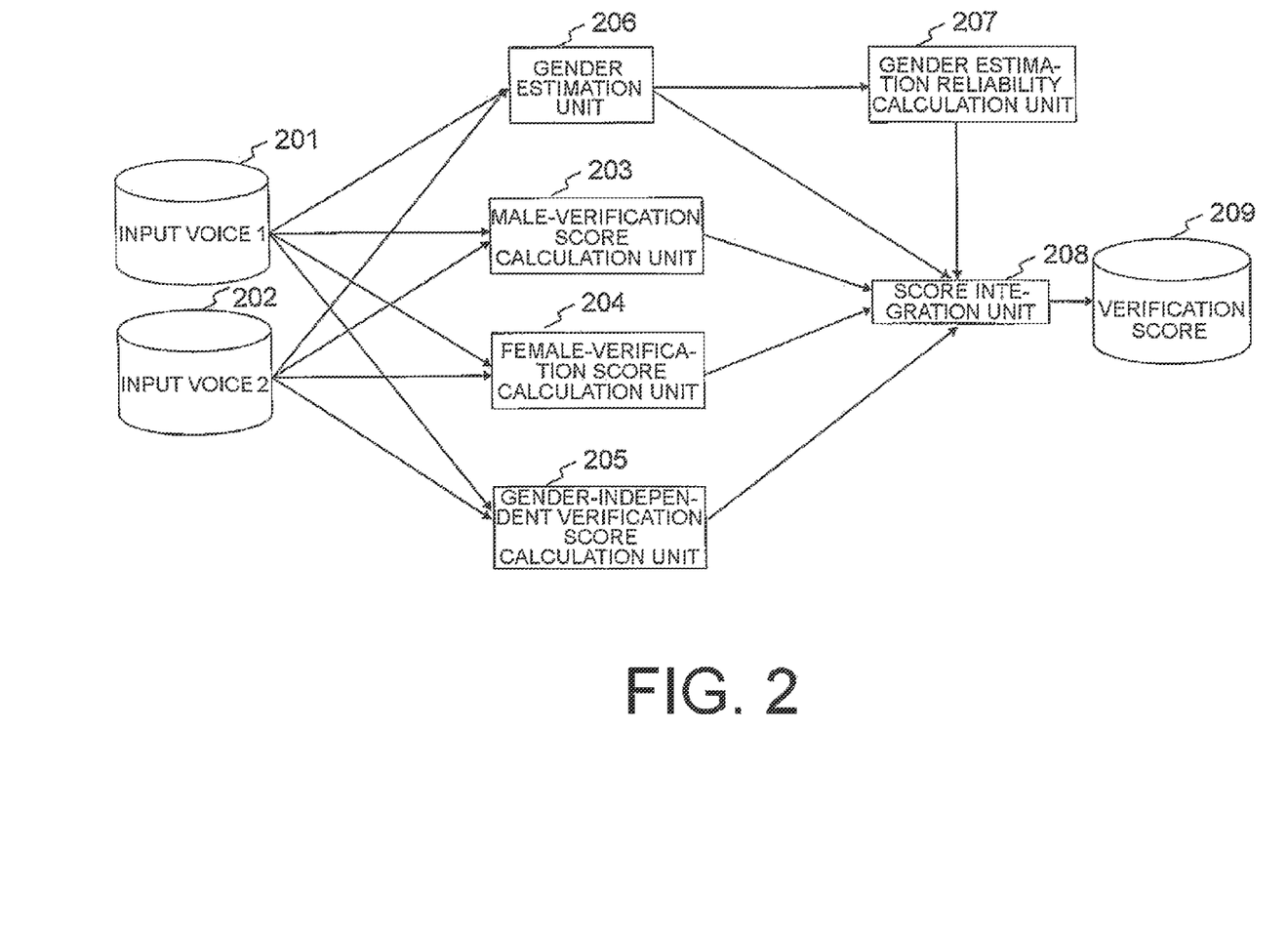
FIG. 2 is a block diagram for illustrating a configuration in a first embodiment of this invention.

Referring to FIG. 2, in the personal authentication device according to the first embodiment of this invention, a male-verification score calculation unit 203 and a female-verification score calculation unit 204 each calculate an attribute-dependent score for each of two input voices (input data) 201 and 202. The male-verification score calculation unit 203 and the female-verification score calculation unit 204 may also be referred to as "plurality of attribute-dependent score calculation units".

A gender-independent verification score calculation unit 205 calculates an attribute-independent score for each of the two input voices 201 and 202. The gender-independent verification score calculation unit 205 may also be referred to as "attribute-independent score calculation unit".

A gender estimation unit 206 performs gender estimation on each of the two input voices 201 and 202 to obtain a likelihood of a gender in each of the voices. The gender estimation unit 206 may also be referred to as "attribute estimation unit".

A gender estimation reliability calculation unit 207 receives the gender estimation result (likelihood of gender) from the gender estimation unit 206 to calculate a reliability of the gender estimation. The gender estimation reliability calculation unit 207 may also be referred to as "attribute estimation reliability calculation unit".

A score integration unit 208 uses the likelihood of a gender from the gender estimation unit 206 and the reliability of the gender estimation from the gender estimation reliability calculation unit 207 to determine weights (score weights) to be given to each of the attribute-dependent scores from the male-verification score calculation unit 203 and the female-verification score calculation unit 204 and to the attribute-independent score from the gender-independent verification score calculation unit 205. The score integration unit 208 then uses the determined weights to integrate the attribute-dependent scores and the attribute-independent score to output an integrated score as a verification score 209.

In this case, when the gender estimation reliability is low, by increasing the weight to be given to the attribute-independent score, it is possible to perform verification that is robust against a failure of gender estimation. Meanwhile, when the gender estimation reliability is high, by increasing the weight to be given to the attribute-dependent score of the estimated attribute, it is possible to obtain high verification accuracy.

Each of the above-mentioned components may be implemented by, for example, a plurality of circuits included in the personal authentication device, and may also be implemented by a central processing unit (CPU) included in the personal authentication device as a control unit to execute processing described later under program control. When the components are implemented by the CPU, the CPU reads out an operation control program stored in advance in a memory built into the personal authentication device or one of various recording media or in an external recording medium, and executes a control operation described later based on the read operation control program.

(Processing Configuration)

Figure 3:
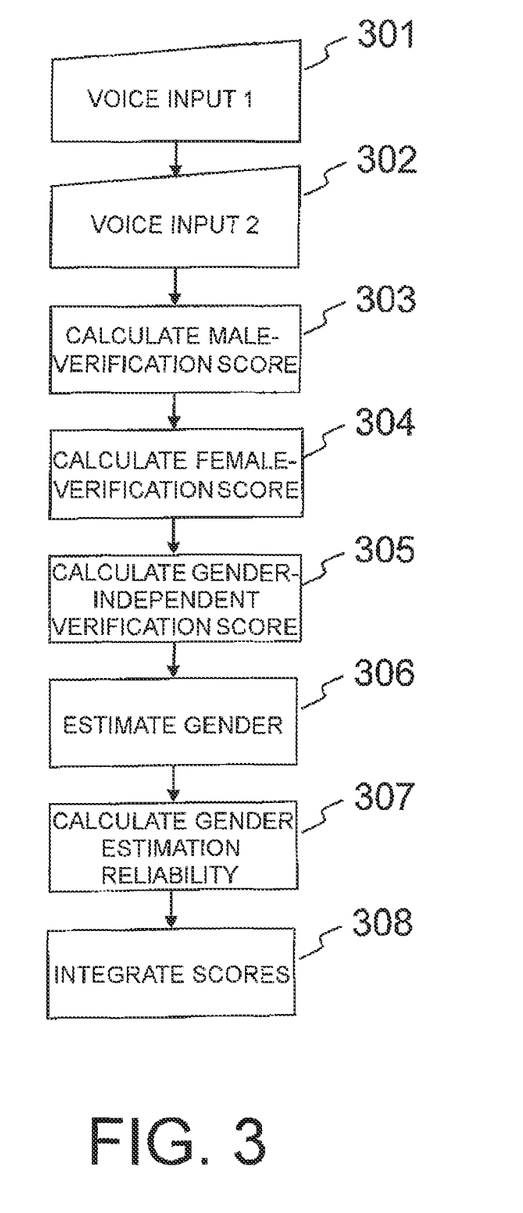
FIG. 3 is a flow chart for illustrating a flow of processing in the first embodiment of this invention.

Next, referring to FIG. 2 and FIG. 3, a flow of personal authentication processing in the first embodiment is described. First, in Step 301, a first voice input 1 is received to obtain the input voice 201. Next, in Step 302, a second voice input 2 is received to obtain the input voice 202.

Subsequently, in Step 303, the male-verification score calculation unit 203 uses the input voice 201 and the input voice 202 to calculate a male verification score as an attribute-dependent score. Next, in Step 304, the female-verification score calculation unit 204 uses the input voice 201 and the input voice 202 to calculate a female verification score as an attribute-dependent score.

Subsequently, in Step 305, the gender-independent verification score calculation unit 205 uses the input voice 201 and the input voice 202 to calculate a gender-independent verification score as an attribute-independent score.

Next, in Step 306, the gender estimation unit 206 uses the input voice 201 and the input voice 202 to calculate a likelihood of each gender. Subsequently, in Step 307, the gender estimation reliability calculation unit 207 calculates and outputs a reliability of a result of the gender estimation.

Next, in Step 308, the score integration unit 208 uses the likelihood of each gender and the reliability of the result of the gender estimation to determine a weight to be given to each of the male verification score, the female verification score, and the gender-independent verification score. The score integration unit 208 then uses the determined weights to integrate the scores, to thereby calculate the verification score 209.

In the flow chart illustrated as an example in FIG. 3, a plurality of steps (processing steps) are illustrated in order, but the order of execution of the steps to be executed in the first embodiment is not limited to the order illustrated in FIG. 3. For example, Step 303 and Step 304 may be executed in the opposite order.

(Actions and Effects of First Embodiment)

As described above, in the first embodiment, the weight of each of the gender-dependent verification scores (male verification score and female verification score) and the gender-independent verification score is determined based on the gender estimation reliability. Specifically, when the gender estimation reliability is high, the weight of a corresponding gender-dependent verification score is increased. Meanwhile, when the gender estimation reliability is low, the weight of the gender-independent verification score, which is robust against a failure of gender estimation, is increased. Then, the scores are integrated.

As described above, according to the first embodiment, it is possible to provide the technology that is robust against a failure of attribute estimation and is capable of achieving high authentication accuracy.

Second Embodiment

A personal authentication device according to a second embodiment of this invention includes: a plurality of attribute-dependent score calculation units configured to calculate, for input data, attribute-dependent scores, which are specialized for a plurality of attributes on a one-to-one basis, and enable high authentication accuracy to be achieved; an attribute-independent score calculation unit configured to calculate, for the input data, an attribute-independent score, which enables high authentication accuracy to be achieved for all of the plurality of attributes; an attribute estimation unit configured to perform attribute estimation on the input data; and a score integration unit configured to determine an integration weight of each of a plurality of attribute-dependent scores and the attribute-independent score based on a result of the attribute estimation, and use the determined integration weights to integrate output scores to output an integrated score. The second embodiment differs from the first embodiment in that the attribute estimation reliability calculation unit is omitted.

A personal authentication method according to the second embodiment of this invention includes: calculating, for input data, attribute-dependent scores, which are specialized for a plurality of attributes on a one-to-one basis, and enable high authentication accuracy to be achieved; calculating, for the input data, an attribute-independent score, which enables high authentication accuracy to be achieved for all of the plurality of attributes; performing attribute estimation on the input data; and determining an integration weight of each of a plurality of attribute-dependent scores and the attribute-independent score based on a result of the attribute estimation, and use the determined integration weights to integrate output scores to output an integrated score.

(System Configuration)

Figure 4:
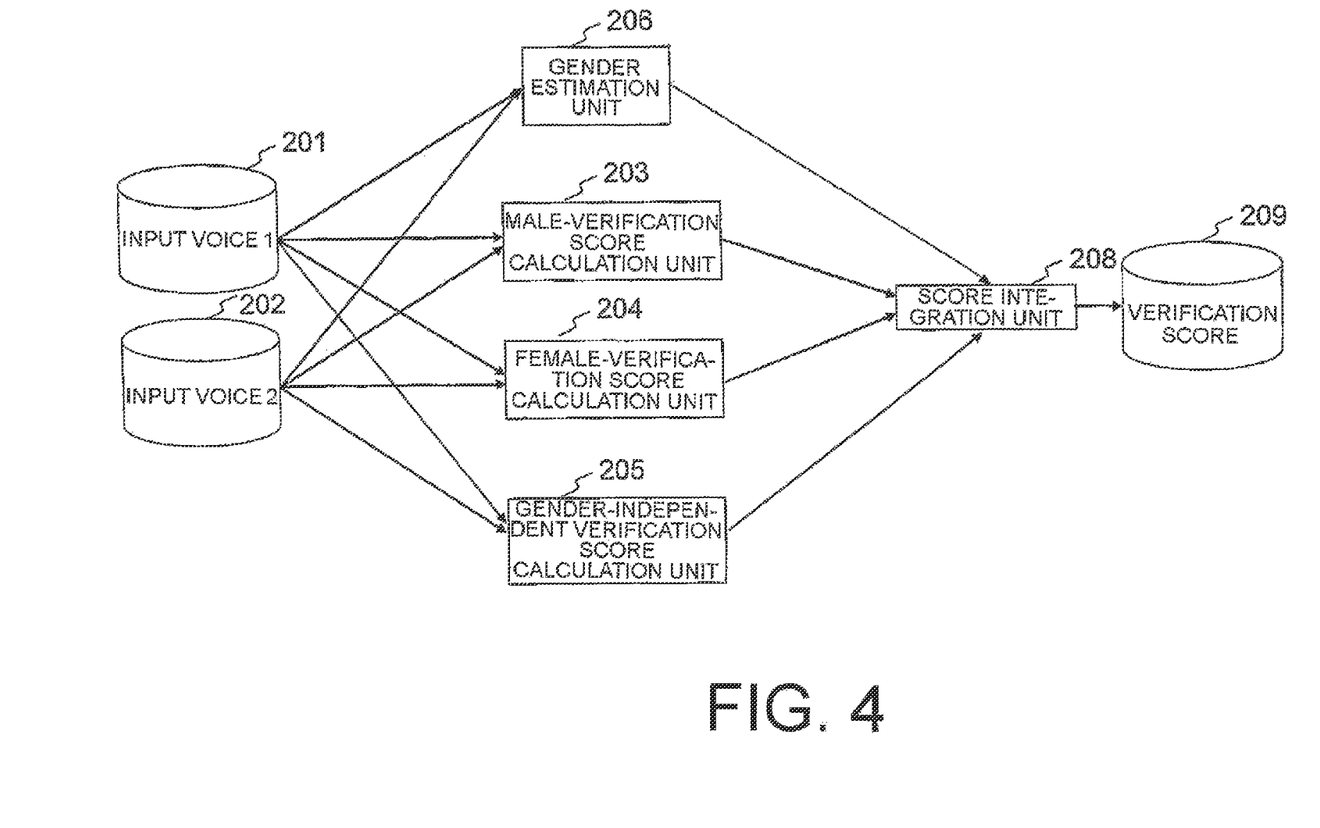
FIG. 4 is a block diagram for illustrating a configuration in a second embodiment of this invention.

Referring to FIG. 4, in the personal authentication device according to the second embodiment of this invention, the male-verification score calculation unit 203 and the female-verification score calculation unit 204 each calculate an attribute-dependent score for each of the two input voices (input data) 201 and 202.

The gender-independent verification score calculation unit 205 calculates an attribute-independent score for each of the two input voices 201 and 202.

The gender estimation unit 206 performs gender estimation on each of the two input voices 201 and 202 to obtain a likelihood of a gender in each of the voices.

The score integration unit 208 uses the likelihood of a gender from the gender estimation unit 206 to determine weights to be given to each of the attribute-dependent scores from the male-verification score calculation unit 203 and the female-verification score calculation unit 204 and to the attribute-independent score from the gender-independent verification score calculation unit 205. The score integration unit 208 then uses the determined weights to integrate the attribute-dependent scores and the attribute-independent score to output an integrated score as the verification score 209.

(Processing Configuration)

Figure 5:
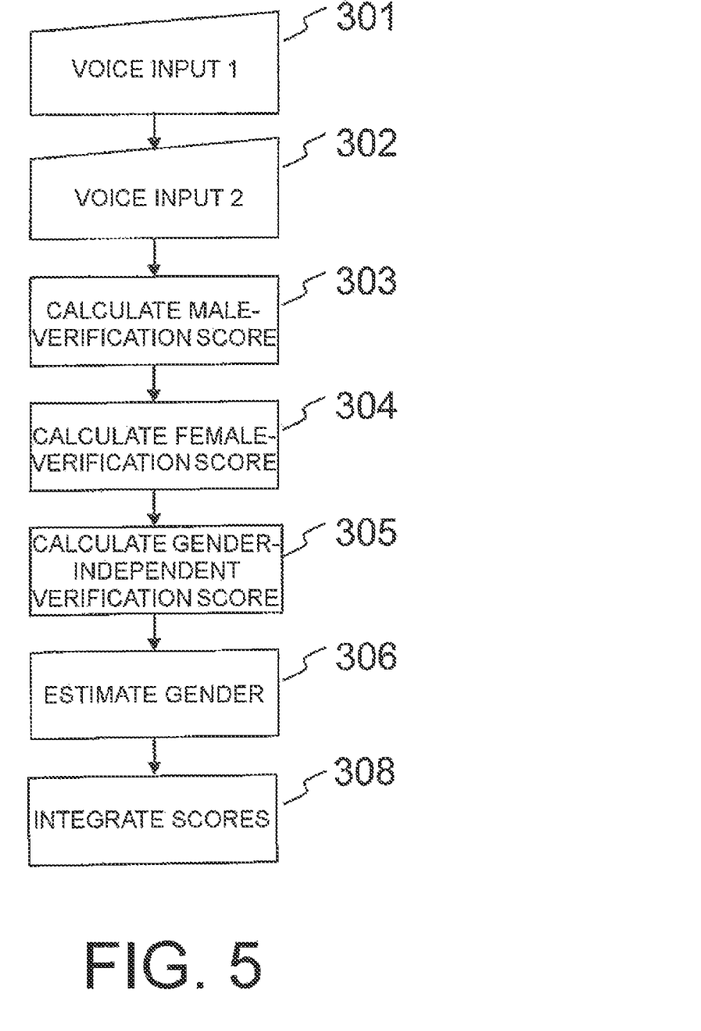
FIG. 5 is a flow chart for illustrating a flow of processing in the second embodiment of this invention.

Next, referring to FIG. 4 and FIG. 5, a flow of personal authentication processing in the second embodiment is described. First, in Step 301, the first voice input 1 is received to obtain the input voice 201. Next, in Step 302, the second voice input 2 is received to obtain the input voice 202.

Subsequently, in Step 303, the male-verification score calculation unit 203 uses the input voice 201 and the input voice 202 to calculate a male verification score as an attribute-dependent score. Next, in Step 304, the female-verification score calculation unit 204 uses the input voice 201 and the input voice 202 to calculate a female verification score as an attribute-dependent score.

Subsequently, in Step 305, the gender-independent verification score calculation unit 205 uses the input voice 201 and the input voice 202 to calculate a gender-independent verification score as an attribute-independent score.

Next, in Step 306, the gender estimation unit 206 uses the input voice 201 and the input voice 202 to calculate a likelihood of each gender.

Next, in Step 308, the score integration unit 208 uses the likelihood of each gender to determine a weight to be given to each of the male verification score, the female verification score, and the gender-independent verification score. The score integration unit 208 then uses the determined weights to integrate the scores, to thereby calculate the verification score 209.

In the flow chart illustrated as an example in FIG. 5, a plurality of steps (processing steps) are illustrated in order, but the order of execution of the steps to be executed in the second embodiment is not limited to the order illustrated in FIG. 5. For example, Step 303 and Step 304 may be executed in the opposite order.

(Effects of Second Embodiment)

As described above, in the second embodiment, the weight of each of the gender-dependent verification scores (male verification score and female verification score) and the gender-independent verification score is determined based on the likelihood of each gender to integrate scores, to thereby be able to achieve high authentication accuracy.

In the following, the first embodiment described above is described in further detail by way of Examples. This invention is not limited by the following Examples in any way.

Example 1

In Example 1 of this invention, in all of the male-verification score calculation unit 203, the female-verification score calculation unit 204, and the gender-independent verification score calculation unit 205, an i-vector being a feature is extracted, and a verification score is calculated through use of probabilistic linear discriminant analysis (PLDA). The difference among those calculation units resides in learning data for a model to be used in the PLDA, and the respective calculation units use, in the PLDA, models trained through use of male data, female data, and both male data and female data.

The gender estimation unit 206 uses Expression (2) to calculate a gender likelihood ratio G.

$$G = \frac{P(z_e \mid M)}{P(z_e \mid F)} \frac{P(z_t \mid M)}{P(z_t \mid F)} \quad (2)$$

In this expression, $p(z_i|M)$ and $p(z_i|F)$ represent likelihoods of voice data (input voice) $z_i$ in a male model and a female model, respectively.

The gender estimation reliability calculation unit 207 uses Expression (3) to calculate a gender estimation reliability C.

$$C = \begin{cases} 1 & (\log G > T_M \text{ or } \log G < T_F)) \\ 0 & (\text{otherwise}) \end{cases} \quad (3)$$

In this expression, $T_M$ and $T_F$ represent fixed threshold values defined in advance.

The score integration unit 208 uses Expression (4) and Expression (5) to calculate a verification score.

$$(\alpha_M, \alpha_F, \alpha_I) = \begin{cases} (1, 0, 0) & (\log G > 0 \text{ and } C = 1) \\ (0, 1, 0) & (\log G < 0 \text{ and } C = 1) \\ (0, 0, 1) & (\text{otherwise}) \end{cases} \quad (4)$$

$$R = \alpha_M R_M + \alpha_F R_F + \alpha_I R_I \quad (5)$$

In this expression, $R_M$ represents a male verification score (gender-dependent verification score), $R_F$ represents a female verification score (gender-dependent verification score), and RI represents a gender-independent verification score. In addition, αM, $\alpha_F$, and $\alpha_I$ represent score weights to be given to the male verification score, the female verification score, and the gender-independent verification score, respectively, when the scores are integrated.

Example 2

Example 2 of this invention differs from Example 1 in the following points.

The gender estimation reliability calculation unit 207 uses Expression (6) to calculate the gender estimation reliability C. That is, the gender estimation reliability calculation unit 207 calculates the gender estimation reliability C through use of a piecewise linear function relating to log G.

$$C = \begin{cases} 1 & (\log G > T_M \text{ or } \log G < T_F)) \\ 1 - \frac{\log G}{T_M} & (0 < \log G < T_M) \\ 1 - \frac{\log G}{T_F} & (T_F < \log G < 0) \end{cases} \quad (6)$$

The score integration unit 208 uses Expression (7) and Expression (5) to calculate the verification scores.

$$(\alpha_M, \alpha_F, \alpha_I) = \begin{cases} (1, 0, 0) & (\log G > 0 \text{ and } C = 1) \\ (0, 1, 0) & (\log G < 0 \text{ and } C = 1) \\ (C, 0, 1 - C) & (0 < \log G < T_M) \\ (0, C, 1 - C) & (T_F < \log G < 0) \end{cases} \quad (7)$$

Example 3

Example 3 of this invention differs from Example 1 in the following points.

The gender estimation reliability calculation unit 207 uses Expression (8) to calculate the gender estimation reliability C. That is, the gender estimation reliability calculation unit 207 calculates the gender estimation reliability C through use of a posterior probability of input data for the attribute-independent model.

$$C = 1 - \frac{p(z_e \mid I)p(z_t \mid I)}{\sum_{k \in M,F,I} p(z_e \mid k)p(z_t \mid k)} \quad (8)$$

In this expression, $p(z_i|I)$ represents a likelihood of voice data (input voice) $z_i$ in a gender-independent model.

The score integration unit 208 uses Expression (9) and Expression (5) to calculate the verification scores. That is, the score integration unit 208 calculates the verification scores by setting a score weight to be given to each score as the posterior probability of each attribute.

$$(\alpha_M, \alpha_F, \alpha_I) = \\ \left( \frac{p(z_e \mid M)p(z_t \mid M)}{\sum_{k \in M,F,I} p(z_e \mid k)p(z_t \mid k)}, \frac{p(z_e \mid F)p(z_t \mid F)}{\sum_{k \in M,F,I} p(z_e \mid k)p(z_t \mid k)}, 1 - C \right) \quad (9)$$

This invention is described above referring to the embodiments and Examples. However, this invention is not limited to the above-mentioned embodiments or Examples. Various modifications that can be understood by a person skilled in the art may be made to the configurations and details of this invention within the scope of this invention. Further, the configurations in the respective embodiments and Examples can be combined with each other without departing from the scope of this invention.

A part or all of the above-mentioned embodiments and Examples may also be described as Supplementary Notes given below, but this invention is not limited to Supplementary Notes given below.

(Supplementary Note 1)

An authentication device, comprising:

a plurality of attribute-dependent score calculation units each being configured to calculate an attribute-dependent score for input data depending on a given attribute;

an attribute-independent score calculation unit configured to calculate an attribute-independent score, which is independent of the given attribute, for the input data;

an attribute estimation unit configured to perform attribute estimation on the input data; and a score integration unit configured to determine a score weight of each of a plurality of attribute-dependent scores and a score weight of the attribute-independent score through use of a result of the attribute estimation, and calculate an output score through use of the attribute-dependent scores, the attribute-independent score, and the determined score weights.

(Supplementary Note 2)

The authentication device according to Supplementary Note 1, further comprising an attribute estimation reliability calculation unit configured to calculate and output a reliability of the result of the attribute estimation, wherein the score integration unit is configured to increase the score weight of the attribute-independent score for input having a low reliability.

(Supplementary Note 3)

The authentication device according to Supplementary Note 2, wherein the score weights of the plurality of attribute-dependent scores and the attribute-independent score are calculated as a continuous function relating to the reliability of the attribute estimation.

(Supplementary Note 4)

The authentication device according to Supplementary Note 2, wherein the attribute estimation reliability calculation unit is configured to use a likelihood ratio of an attribute, which is obtained by the attribute estimation unit, to calculate the reliability.

(Supplementary Note 5)

The authentication device according to Supplementary Note 4, wherein the reliability is calculated as a piecewise linear function relating to a likelihood ratio of the attribute estimation.

(Supplementary Note 6)

The authentication device according to Supplementary Note 2, wherein the attribute estimation reliability calculation unit is configured to use a posterior probability of the attribute estimation, which is obtained by the attribute estimation unit, to calculate the reliability.

(Supplementary Note 7)

The authentication device according to Supplementary Note 2 or 6, wherein the score integration unit is configured to determine each of the score weights of the attribute-independent score and the plurality of attribute-dependent scores, as a posterior probability calculated by the attribute estimation unit.

(Supplementary Note 8)

An authentication method, comprising:

calculating a plurality types of attribute-dependent scores for input data depending on a given attribute;

calculating an attribute-independent score, which is independent of the given attribute, for the input data;

performing attribute estimation on the input data; and determining a score weight of each of the plurality types of attribute-dependent scores and a score weight of the attribute-independent score through use of a result of the attribute estimation, and calculating an output score through use of the attribute-dependent scores, the attribute-independent score, and the determined score weights.

(Supplementary Note 9)

The authentication method according to Supplementary Note 8, further comprising calculating and outputting a reliability of the result of the attribute estimation, wherein, in the calculating of the output score, increasing the score weight of the attribute-independent score for input having a low reliability.

(Supplementary Note 10)

A program for causing a computer to execute:

calculating a plurality types of attribute-dependent scores for input data depending on a given attribute;

calculating an attribute-independent score, which is independent of the given attribute, for the input data;

performing attribute estimation on the input data; and determining a score weight of each of the plurality types of attribute-dependent scores and a score weight of the attribute-independent score through use of a result of the attribute estimation, and calculating an output score through use of the attribute-dependent scores, the attribute-independent score, and the determined score weights.

(Supplementary Note 11)

The program according to Supplementary Note 10, further comprising to execute calculating and outputting a reliability of the result of the attribute estimation, wherein, in the calculating of the output score, increasing the score weight of the attribute-independent score for input having a low reliability.

INDUSTRIAL APPLICABILITY

This invention is generally applicable to an authentication device and authentication method for authenticating an individual or the like through use of biometric information.

| Reference Signs List | |
| --- | --- |
| 101, 201 | input voice 1 |
| 102, 202 | input voice 2 |
| 103, 203 | male-verification score calculation unit |
| 104, 204 | female-verification score calculation unit |
| 105, 206 | gender estimation unit |
| 106, 208 | score integration unit |
| 107, 209 | verification score |
| 205 | gender-independent verification score calculation unit |
| 207 | gender estimation reliability calculation unit |
| 301 | input voice 1 |
| 302 | input voice 2 |
| 303 | calculate male-verification score |
| 304 | calculate female-verification score |
| 305 | calculate gender-independent verification score |
| 306 | estimate gender |
| 307 | calculate gender estimation reliability |
| 308 | integrate score |

The invention claimed is:

1. An authentication device, including:
one or more processors; and
one or more memories storing one or more programs executable by the one or more processors to:
calculate, for an input voice data, a plurality of first scores that are attribute-dependent scores respectively depending on given attributes, and a second score that is an attribute-independent score independent of the given attributes;
perform, on the input voice data, attribute estimation related to the first score the given attributes;
calculate, based on a result of the attribute estimation, respective weights for the plurality of first scores and the second score; and
calculate a verification score for personal authentication by integrating the plurality of first scores and the second score as weighted by the respective weights.

2. The authentication device according to claim 1, wherein the one or more programs are executable by the one or more processor to calculate and output a reliability of the attribute estimation,
   wherein, in calculating the respective weights, the respective weight for the second score is increased with decreased reliability of the attribute estimation.

3. The authentication device according to claim 2, wherein the respective weights for the plurality of first scores and the second score are calculated as a continuous function relating to the reliability of the attribute estimation.

4. The authentication device according to claim 2, wherein a likelihood ratio of the given attributes is used to calculate the reliability.

5. The authentication device according to claim 4, wherein the reliability is calculated as a piecewise linear function relating to the likelihood ratio.

6. The authentication device according to claim 2, wherein a posterior probability of the attribute estimation to calculate the reliability.

7. The authentication device according to claim 2, wherein the respective weights of the plurality of first scores and the second score are each calculated as a posterior probability calculated.

8. The authentication device according to claim 6, wherein the respective weights of the plurality of first scores and the second score are each calculated as a posterior probability calculated.

9. An authentication method comprising:
   calculating, by a processor and for an input voice data, a plurality of first scores that are attribute-dependent scores respectively depending on given attributes, and a second score that is an attribute-independent score independent of the given attributes;
   performing, by the processor and on the input voice data, attribute estimation related to the given attributes;
   calculating, by the processor and based on a result of the attribute estimation, respective weights for the plurality of first scores and the second score; and
   calculating, by the processor, a verification score for personal authentication by integrating the plurality of first scores and the second score as weighted by the respective weights.

10. The authentication method according to claim 8, further comprising calculating and outputting, by the processor, a reliability of the attribute estimation,
    wherein, in calculating the respective weights, the respective weight for the second score is increased with decreased reliability of the attribute estimation.

11. A non-transitory recording medium storing a program executable by a computer to perform:
    calculating, for an input voice data, a plurality of first scores that are attribute-dependent scores respectively depending on given attributes, and a second score that is an attribute-independent score independent of the given attributes;
    performing, on the input voice data, attribute estimation related to the first score the given attributes;
    calculating, based on a result of the attribute estimation, respective weights for the plurality of first scores and the second score; and
    calculating a verification score for personal authentication by integrating the the plurality of first scores and the second score as weighted by the respective weights.

* * * * *